United States Patent
Iovanna et al.

(10) Patent No.: US 9,172,549 B2
(45) Date of Patent: Oct. 27, 2015

(54) REDUCING NETWORK POWER CONSUMPTION

(75) Inventors: Paola Iovanna, Rome (IT); Antonio D'Errico, Calci (IT); Francesco Testa, Pomezia Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 84 days.

(21) Appl. No.: 13/701,578

(22) PCT Filed: Jul. 14, 2010

(86) PCT No.: PCT/EP2010/060135
§ 371 (c)(1),
(2), (4) Date: Dec. 3, 2012

(87) PCT Pub. No.: WO2011/150983
PCT Pub. Date: Dec. 8, 2011

(65) Prior Publication Data
US 2013/0070754 A1    Mar. 21, 2013

(30) Foreign Application Priority Data
Jun. 3, 2010  (EP) .................................. 10164850

(51) Int. Cl.
*H04L 12/28*   (2006.01)
*H04L 12/02*   (2006.01)
(Continued)

(52) U.S. Cl.
CPC ................ *H04L 12/02* (2013.01); *H04L 45/00* (2013.01); *H04L 45/127* (2013.01); *H04L 45/123* (2013.01)

(58) Field of Classification Search
CPC ....... H04L 12/02; H04L 45/00; H04L 45/123; H04L 45/127

USPC ............... 370/230, 230.1, 231–235, 252, 370/352–356, 389, 392, 400–401
See application file for complete search history.

(56) References Cited

U.S. PATENT DOCUMENTS 6,389,010 B1 *   5/2002   Kubler et al. .................. 370/353
7,035,207 B2 *   4/2006   Winter et al. .................. 370/225
(Continued)

FOREIGN PATENT DOCUMENTS

EP    2 043 311    4/2009
EP    2 166 777    3/2010

OTHER PUBLICATIONS

International Search Report for PCT/EP2010/060135 mailed Nov. 10, 2010.
(Continued)

*Primary Examiner* — Kevin Mew
(74) *Attorney, Agent, or Firm* — Baker Botts, LLP

(57) ABSTRACT

Path computation involves determining (120, 930) an aggregate cost for a portion of the path, based at least on the power consumption attributable to use of interfaces along that portion, comparing (130, 930) the portion of the first possible path with a different portion corresponding to a different possible path for the traffic request, based at least on their respective aggregate costs, and selecting (140, 930) which portion to use for the traffic request based on the comparison. Having path selection influenced by the power consumption values, can lead to lower overall consumption in operation than relying only on optimizing nodes individually without regard to how the nodes are used. Path selection can take into account indications of which parts are in a power down mode, and can involve powering up such parts if needed.

12 Claims, 12 Drawing Sheets

(51) Int. Cl.
*H04L 12/701* (2013.01)
*H04L 12/721* (2013.01)

(56) References Cited

U.S. PATENT DOCUMENTS

| | | | |
|---|---|---|---|
| 7,266,085 B2* | 9/2007 | Stine | 370/252 |
| 7,343,441 B1* | 3/2008 | Chrysanthakopoulos et al. | 710/313 |
| 7,480,248 B2* | 1/2009 | Duggi et al. | 370/238 |
| 7,551,568 B2* | 6/2009 | Jeong et al. | 370/252 |
| 7,590,068 B2* | 9/2009 | Larsen et al. | 370/238 |
| 7,652,983 B1* | 1/2010 | Li et al. | 370/217 |
| 7,729,260 B2* | 6/2010 | Larsson et al. | 370/238 |
| 8,086,428 B2* | 12/2011 | Tanaka et al. | 703/2 |
| 8,165,143 B2* | 4/2012 | Samajpati | 370/401 |
| 2005/0018623 A1 | 1/2005 | Bantz et al. | |
| 2005/0041591 A1* | 2/2005 | Duggi et al. | 370/238 |
| 2005/0111428 A1 | 5/2005 | Orlik et al. | |
| 2007/0070909 A1* | 3/2007 | Reeve | 370/238 |
| 2009/0046712 A1* | 2/2009 | Nordmark et al. | 370/389 |
| 2009/0067331 A1 | 3/2009 | Watsen et al. | |
| 2010/0118881 A1 | 5/2010 | Palmer et al. | |
| 2010/0122100 A1* | 5/2010 | Strumper | 713/320 |
| 2010/0127881 A1* | 5/2010 | Schechter et al. | 340/584 |
| 2010/0169677 A1* | 7/2010 | Madhusoodanan | 713/310 |
| 2011/0075583 A1* | 3/2011 | Imai et al. | 370/252 |
| 2012/0158299 A1* | 6/2012 | Cerecke et al. | 701/533 |
| 2013/0028104 A1* | 1/2013 | Hui et al. | 370/252 |

OTHER PUBLICATIONS

B. Zhang et al., "Localized Power-Aware Routing for Wireless ad Hoc Networks", Communications, 2004 IEEE International Conference on Paris, vol. 6, Jun. 2004, pp. 3754-3758.

* cited by examiner

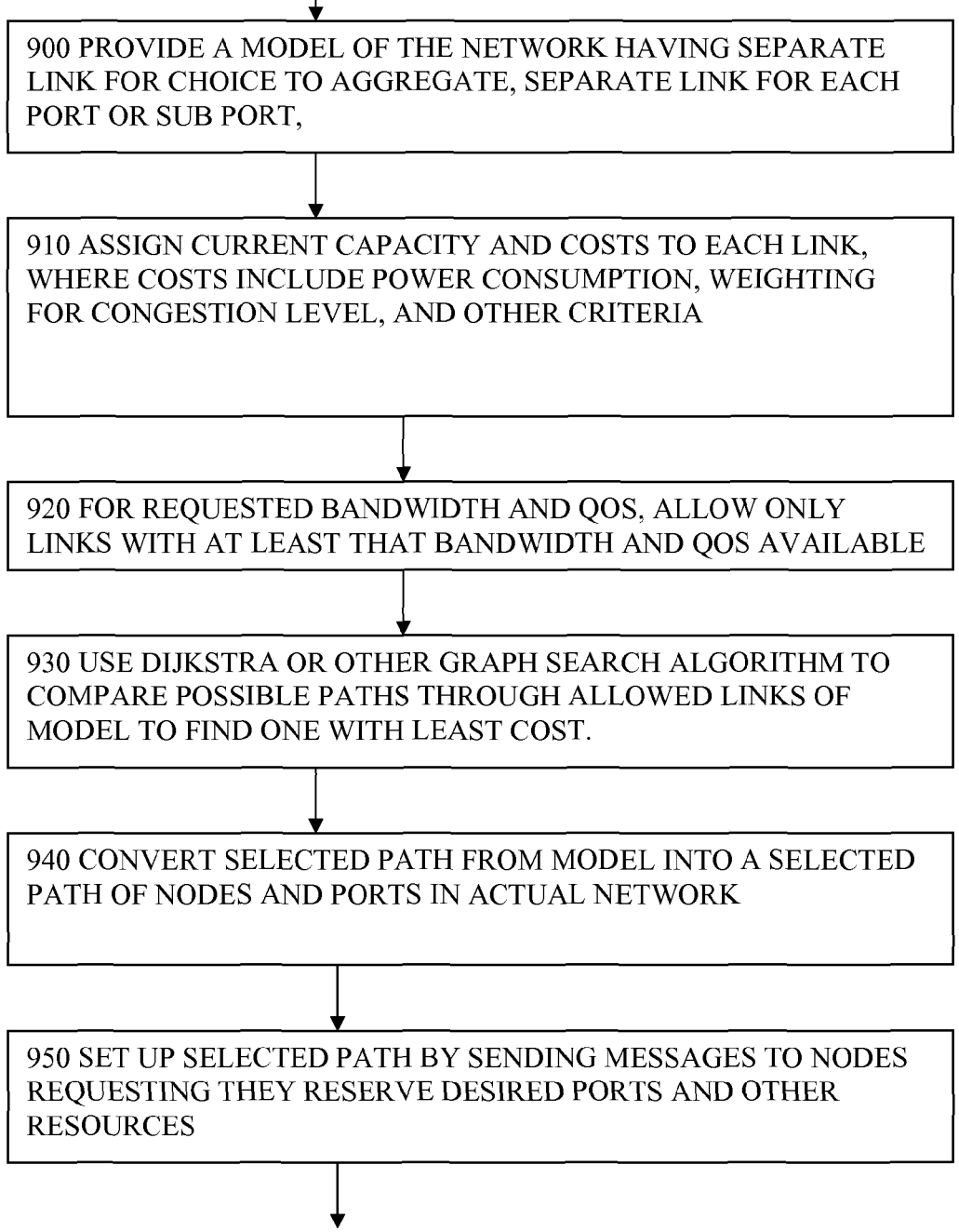

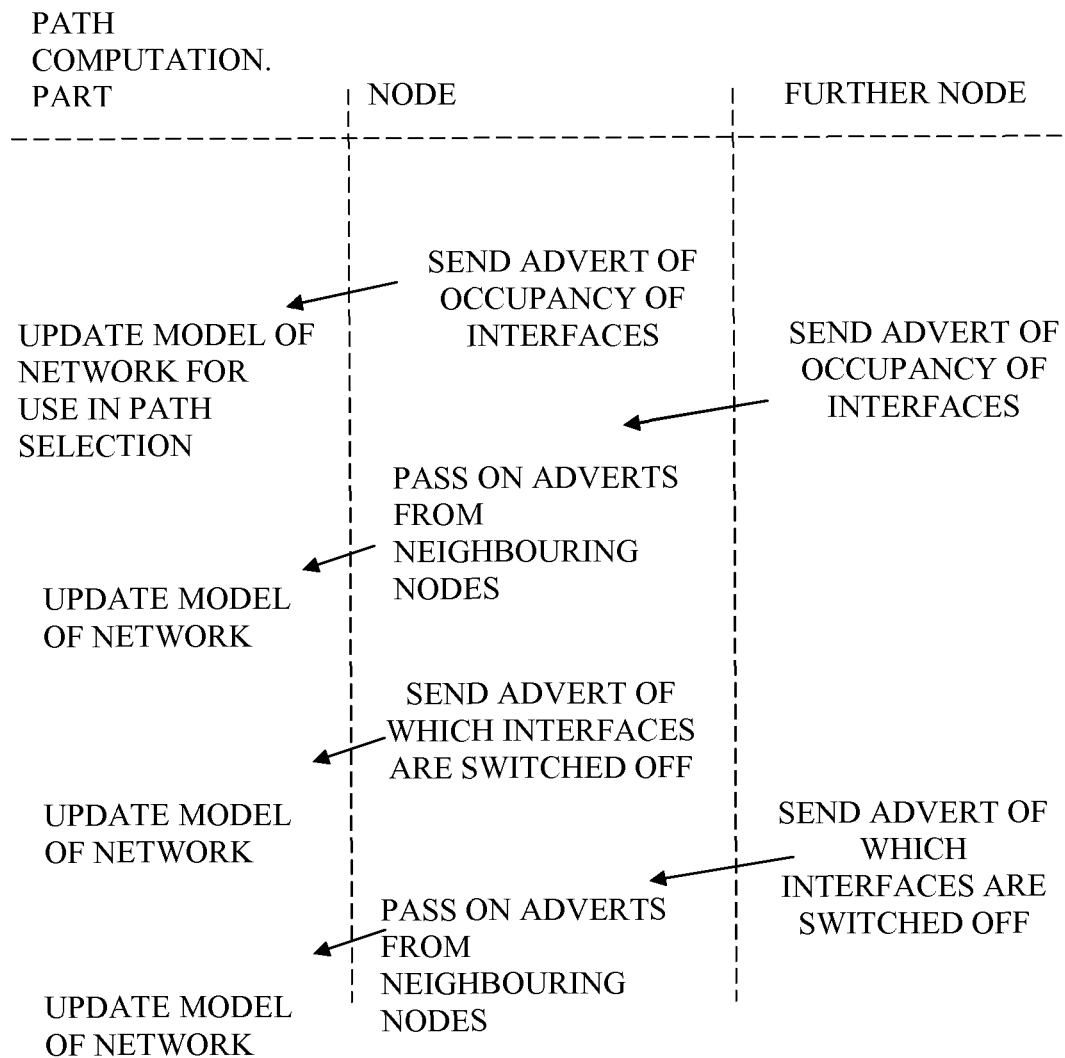

US 9,172,549 B2

REDUCING NETWORK POWER CONSUMPTION

This application is the U.S. national phase of International Application No. PCT/EP2010/060135 filed 14 Jul. 2010 which designated the U.S. and claims priority to EP 10164850.9 filed 3 Jun. 2010, the entire contents of each of which are hereby incorporated by reference.

FIELD OF THE INVENTION

This invention relates to methods of determining a path between nodes in a network, to programs for carrying out such methods, to path selection processors, and to nodes for such networks arranged to advertise information for use in such path selection methods.

BACKGROUND

It is known to try to reduce power consumption of nodes in a network, for example by installing less power consuming nodes such as optical nodes, and by defining node architectures where different switching technologies such as packet and optical are included in order to limit the electrical processing of the traffic and favor traffic off-load towards the optical layer. This can involve providing optical bypass paths around a router. Another known way to reduce power consumption of an individual node is to switch off unused ports when the node determines that they are unused.

In other words, equipment vendors have tried to provide efficient node architectures including providing more optical switching and favoring optical bypass. This is useful but it is not enough.

SUMMARY OF THE INVENTION

An object of the invention is to provide improved apparatus or methods. According to a first aspect, the invention provides a method of determining a path between nodes in a network in response to a traffic request by determining for at least a portion of a first possible path, which interfaces are used by that portion, and for each interface, determining a power consumption attributable to use of that interface by the path passing through that node. An aggregate cost based on at least power consumption for that portion of the path, attributable to use of interfaces along that portion can be determined, and the portion of the first possible path is compared with a different portion corresponding to a different possible path for the traffic request, based at least on their respective aggregate costs. Which portion to use for the traffic request can be selected based on the comparison.

In this new approach, determining power consumption attributable to portions of possible paths, means that the path selection can be influenced by the power consumption values, which can lead to lower overall consumption in operation rather than relying only on optimizing nodes individually without regard to how the nodes are used. Compared to other ways of reducing power consumption based on improving nodes by replacing older electronics equipment, or providing more optical bypass paths around a router, the path selection approach takes a wider network view. This means power consumption can be improved without needing additional capital expenditure on new equipment, it can benefit existing networks, and is compatible with those other ways of reducing power consumption. Furthermore, if traffic is limited by power consumption, for example by cooling constraints in an outdoor cabinet in a hot climate, then it might be possible to accept more traffic requests or to operate a node within that constraint with reduced thermal margins if the power consumptions are determined before path selection.

Any additional features can be added to those discussed above, and some are described in more detail below.

Another aspect of the invention can involve a corresponding computer program for carrying out the method.

Another aspect provides a corresponding path computation processor arranged to carry out the method. Another aspect provides a node for a network, the node having at least one interface for use by traffic, and being arranged to exchange messages with neighbouring nodes to advertise node information for use in path selection, the node information comprising an indication whether part of the interface is currently in a power-down mode, and whether that part is available to be powered up to provide a path for traffic.

This can enable the likely power consumption to be determined more accurately, according to actual conditions. This can be used for path selection methods set out above, to reduce power consumption. This could be implemented for some types of network by an extension to OSPF to enable a node to advertise when some part of a port or device is switched off for example.

Another aspect provides a node for a network, the node having at least one interface for use by traffic, the interface having a part which can be in a power-down mode, and being arranged to exchange messages with a neighbouring node to set up a selected path, involving receiving a message requesting the node to switch on the part of the interface. The node can respond by switching that part from a power-down mode to a power up mode.

This can enable the path selection to take into account and control equipment which has power down modes, so that the overall power consumption can be reduced. This could be implemented in some networks by an extension to RSVP-TE to support switching on of interfaces or parts of interfaces that are powered down only to save power.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 12 shows steps in computing paths using a model of the network, and FIG. 13 shows a sequence chart showing passing messages to advertise node information for use by a path computation part.

DETAILED DESCRIPTION

Figure 1:
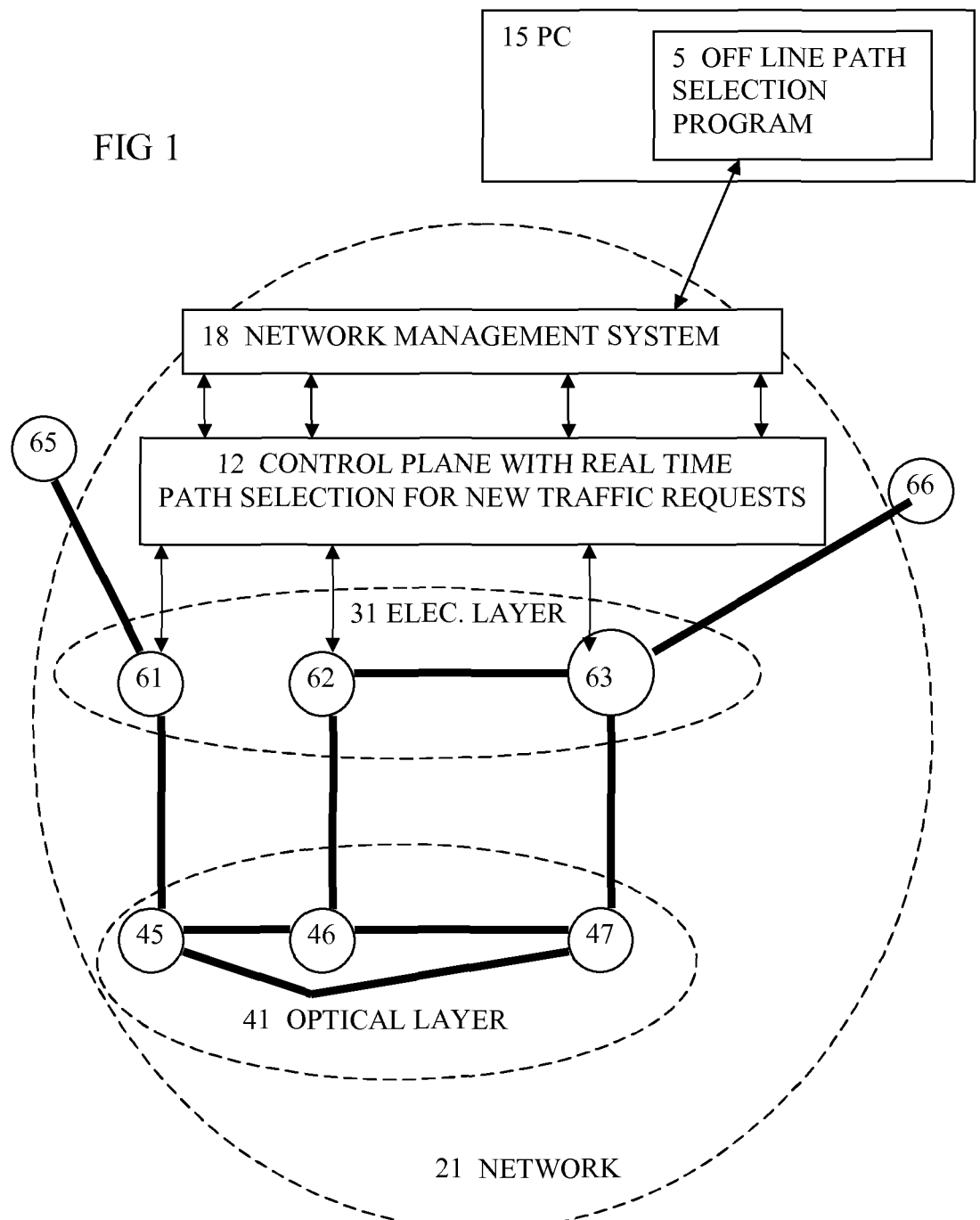
FIG. 1 shows a schematic view of a network to which embodiments can be applied.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to switching nodes can encompass any kind of switching node, not limited to the types described, not limited to any level of integration, or size or bandwidth or bit rate and so on.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

References to a traffic request can encompass for example a request to send a packet or packets, one or more connections, one or more wavelengths and so on.

References to interfaces can encompass a physical port or portion of a physical port, one or more wavelengths of a wavelength multiplexed interface, one or more time slots of a time division multiplexed interface, one or more packets or connections at a packet based or connection based interface and so on.

References to layers can encompass optical layers, electrical layers, optical transport network (OTN) layers, packet layers and so on, and are not intended to exclude the possibility of having multiple different technologies within the same layer.

References to costs are intended to encompass any criteria useful for obtaining better path computation decisions, such as how well filled are bandwidth allocations such as wavelengths, how congested are packet buffers likely to become, how much noise or delay is added and so on, not limited to financial costs in terms of operating or capital expenditures.

Introduction

By way of introduction to the embodiments, some issues with power consumption and path computation will be explained. Power consumption should be dealt at network level as well as dealing with it at the equipment or node level, in order to maximize the advantage of having nodes and technologies with lower power consumption. This approach requires defining provisioning and routing mechanisms that can force the use of "greener" paths taking into account the network, the available resources and the traffic demands.

Provisioning is something that acts off-line during the "dimensioning" and planning of the networks, while routing is something that acts on-line taking into account the current situation of an already operative network. Routing and path-provisioning can be complex tasks and sometime it is not enough to select the shortest path to maximize the network resources usage and reduce capex (capital expenditure). Instead longer paths are selected in certain traffic conditions because the performance in terms of resource optimization is better than always using just the shortest available path.

Path computation is needed in many different types of network. An example is the Internet, which is a conglomeration of Autonomous Systems (AS) or domains that define the administrative authority and the routing policies of different organizations. These domains consist of routers that run Interior Gateway Protocols (IGPs) such as Routing Information Protocol (RIP), Enhanced Interior Gateway Routing Protocol (EIGRP), Open Shortest Path First (OSPF), and Intermediate System-to-Intermediate System (IS-IS) within their boundaries. Neighbouring domains are interconnected via an Exterior Gateway Protocol (EGP); the current Internet standard EGP is the Border Gateway Protocol Version 4 (BGP-4) defined in RFC 4271.

Exterior routing protocols were created to control the expansion of routing tables and to provide a more structured view of the Internet by segregating it into separate administrations, or domains, each with their own independent routing policies and unique IGPs.

These routing protocols define how routers determine their 'map' of the network and from which they can compute the shortest path to a destination, allowing routing to be a largely automatic process. However, the shortest path is not always the fastest or the best. Traffic Engineering (TE) is the process where data is routed through the network according to the availability of resources and the current and expected traffic. The required quality of service (QoS) can also be factored into this process. Traffic Engineering may be under the control of operators whereby they monitor the state of the network and route the traffic, or provision additional resources, to compensate for problems as they arise. Alternatively, Traffic Engineering may be automated. Traffic Engineering helps the network provider make the best use of available resources, spreading the load over the layer 2 links, and allowing some links to be reserved for certain classes of traffic or for particular customers.

Technologies such as Multi-Protocol Label Switching (MPLS) and its extensions (i.e. GMPLS, T-MPLS), provide efficient TE solutions within a single domain thanks to their connection oriented nature, to minimize costs.

Until now, power consumption minimization has not been considered in a network context, as opposed to trying to reduce equipment or node power consumption. If now power consumption on each node is included as one of the costs to be considered, then the path computation (also called path selection or routing) can be adapted to minimize the power consumption in a network as a whole taking into account all traffic.

An underlying concept is to perform path computation in order to minimize the power consumption in the network as a whole. This can be performed either off-line during path provisioning or on-line during dynamic routing, or at both times. This can involve defining a cost in terms of power consumption for each interface of a node. This should be represented in a common range of values to be independent of the technology (e.g. packet, optical, etc.) and independent of the node architectures (e.g. single or multi-layer nodes). Based on such parameters, path computation can be carried out using conventional algorithms, in order to optimize the cost of the network, where the cost now includes a factor based on power consumption of interfaces along proposed paths. Such cost can be used as a further cost for a link in addition to traditional traffic engineering (TE) and/or administrative cost. Path computation can tend towards finding a set of paths having lowest overall cost, the set being all or part of the network, with respect to the specific network topology and pattern of traffic demand, due to the fact the concurrently minimization of the resources and minimization of the cost of the network are applied.

In principle it should be more convenient to aggregate the traffic in order to avoid using packet layers where there is an option to favor use of optical nodes which typically have lower power consumption. In other cases a different situation can exist, where a lower amount of traffic aggregation turns out best if some paths in the network use packet nodes instead of optical bypass paths if that enables more traffic to be accommodated (thus optimizing use of resources) even if packet interface has a major power consumption cost.

Power consumption minimization can be performed both during path-provisioning where a predicted traffic matrix has to be served and during dynamic routing where a traffic demand at time has to be served.

FIG. 1, Features of Embodiments

FIG. 1 shows an overview of a network 21 having a number of nodes. A network management system 18 is coupled to a control plane 12. This control plane can be implemented in a centralized or distributed manner as would be known to those skilled in the art. The control plane can undertake path selection in the form of dynamic routing in real time for new traffic requests. The control plane is coupled to switching nodes which can be in the electrical layer 31 or the optical layer 41. Some nodes can be multilayer, having switching in both layers. A number of links between nodes are shown, a typical network would have many more. A traffic requester 65 outside the network could be an interface from a corporate intranet, or a user terminal for example, requesting traffic from a traffic source 66 such as a remote server. The request can be managed by the network management system, or can be handled directly by the ingress node, in this case switch 61. There are a number of possible paths between the source 66 and the destination 65, passing through electrical switches 61, 62 and 63, and optical switches 45, 46 and 47. The electrical switches can comprise packet based switches or connection oriented switches for example. Hence the path computation can be extended to cover the packet layer and thus cover more than two layers for example.

Path computation can be carried out either dynamically by the control plane 12, or off line by an off line path computation program 5 shown running on a computer PC 15 outside the network, and used either for path provisioning during network design before installation, or for determining how best to upgrade the network by providing new capacity. If the path computation is carried out externally to the ingress node, then the requesting entity or the ingress node needs to pass all the necessary information to the external part.

Figure 2:
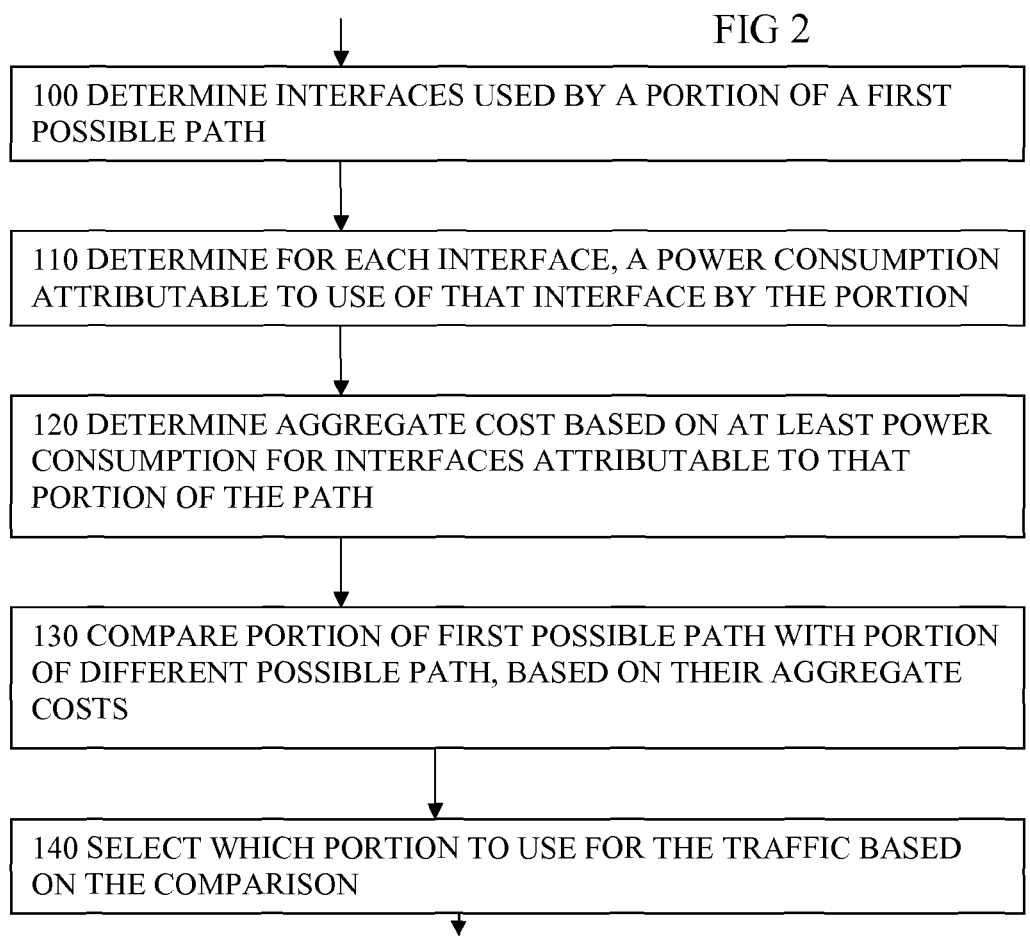
FIG. 2 shows steps according to an embodiment.

FIG. 2, Steps of Embodiments

FIG. 2 shows steps according to an embodiment, to be carried out for example by the control plane or the path computation program of FIG. 1, or by other equipment. At step 100 the interfaces used by a portion of a first possible path are determined. At step 110 for each interface a power consumption is determined, attributable to the use of that interface by the path. At step 120, an aggregate cost based on at least power consumption for the interfaces attributable to that portion of the path is determined, which can include costs of aggregating traffic and rerouting other paths as appropriate. At step 130 the aggregate is compared to aggregate costs for alternative possible routes for that portion of the path. Other criteria for determining aggregate costs can include traffic parameters or constraints. For MPLS, RFC 4657 lists a number of possible constraints such as Bandwidth—Affinities inclusion/exclusion—Link, Node, Shared Risk Link Group (SRLG) inclusion/exclusion—Maximum hop count—Maximum end-to-end TE metric—Degree of paths disjointness (Link, Node,)—Local protection—Node protection—Bandwidth protection—Switching type, encoding type—Link protection type and so on.

Based on the comparison, a route for that portion of the path is chosen at step 140. These basic steps enable the path computation to proceed to find a lowest cost route where power consumption of the interfaces is a factor. There are many ways to implement these basic steps, and many other additional steps can be added.

The method can enable reducing power consumption in multi-layer nodes/networks performing traffic-off-load suitably taking into account network topology, traffic matrix. It can determine paths based on the power consumption cost and taking into account the minimization of network resources usage. Traffic aggregation and routing can be chosen for a specific network topology and traffic, to help reduce or minimize traffic dependent power consumption during path provisioning or/and dynamic routing.

Some Additional Features

In some cases the network can be live and have existing traffic, the traffic request being made in real time, the method steps being made in real time, and the method having the further step of sending traffic over the selected path. In other words the advantages are applicable to adapting existing networks to enable them to be operated more efficiently. Alternatively or as well, the steps can be carried out off-line, and the method can have the further step of updating a representation of paths occupied by traffic in a logical model of the network based on the selecting step. By carrying out the path selection off-line, the effects of the selection can be evaluated, and if needed, undone and alternative selections can be tried. The results can be used either for provisioning a new network, in which case the traffic request could be part of a model of traffic demand, or for reconfiguring an existing network, to the extent that it allows existing traffic to be moved to new paths. In this case the traffic request could be for real traffic, provided it can wait for the path selection to be made off line.

The different path can involve a different choice of traffic aggregation for the requested traffic with other traffic previously routed, and the attributable power consumption being dependent on the traffic aggregation, and the selecting of the path involving selecting the aggregation. The power consumption savings achieved by more aggregation may make an otherwise costly route seem more favourable.

The method can involve determining whether a further different path can be provided by rerouting some other traffic previously routed, such that a lower total cost for the other traffic and the new traffic can exist. This can in some cases enable a further improvement in paths selected.

The different path can have a different choice of layers used in a multi layer node, the different layers having different attributable power consumptions, and the selecting involving selecting which of the layers to use. This can give another choice which can be used to further improve the path selection to make best use of resources.

The method can involve determining an overall cost of paths for the traffic request and for other traffic requests, and the selecting step being dependent on the overall cost.

This can enable favouring a path which is individually more costly, if it enables other paths to be less costly, and so reduce an overall cost, where costs can include the power consumption values.

The method can involve determining a power consumption of an interface involving determining whether part of that interface is currently in a power-down mode, and whether that part would need to be powered up for the path. This can enable the likely power consumption to be determined more accurately, according to actual conditions. This could be implemented for some types of network by an extension to OSPF to enable a node to advertise when some part of a port or device is switched off for example.

Where there is a part currently in a power-down mode, the method can involve setting up the selected path by sending a message to a node which has the power-down part, to cause that part to be powered up. This can enable the path selection to take into account and control equipment which has power down modes, so that the overall power consumption can be reduced. This could be implemented in some networks by an extension to RSVP-TE to support switching on of interfaces or parts of interfaces that are powered down only to save power.

The other criteria can comprise a current status of an interface, and the method can involve sending a query message to nodes on the possible path and receiving a response from the nodes indicating a current status of an interface. This can again enable up to date information to be used in the path selection. The current status can include for example occupancy, parts powered down, parts of the power consumption that are dynamic, and so on.

The network can be an optical network having a control plane, the method being carried out by the control plane, the control plane can be arranged to use MPLS protocols, and the possible paths can have interfaces in multiple layers under the control of the control plane. The advantages can be particularly applicable to such networks and layers because the selection decisions tend to affect larger amounts of traffic.

Figure 3:
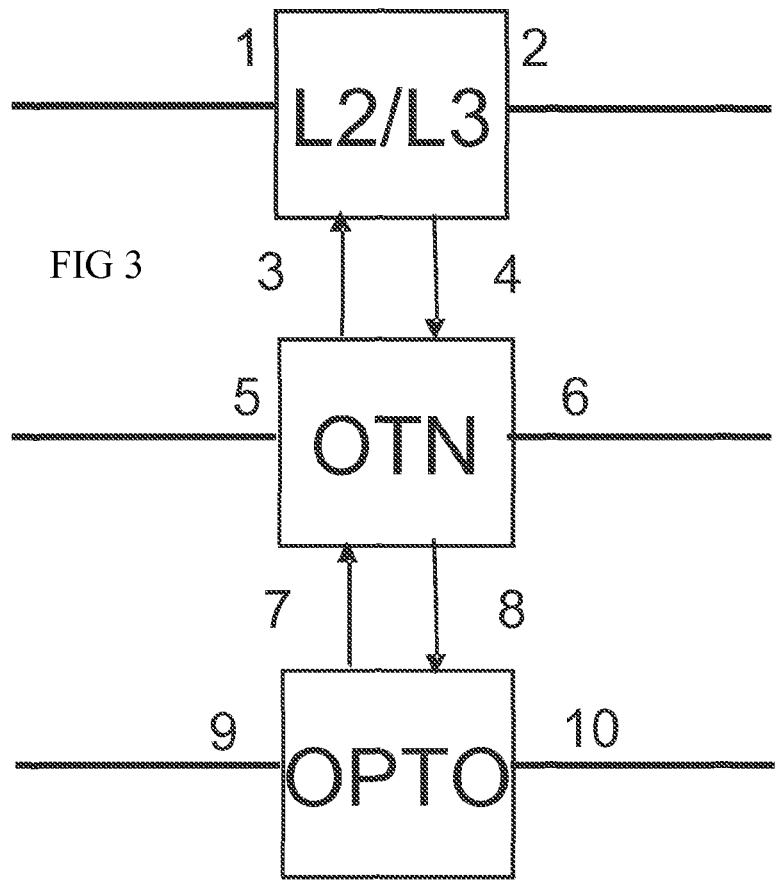
FIGS. 3 and 4 show interfaces in a multi layer node.
Figure 4:
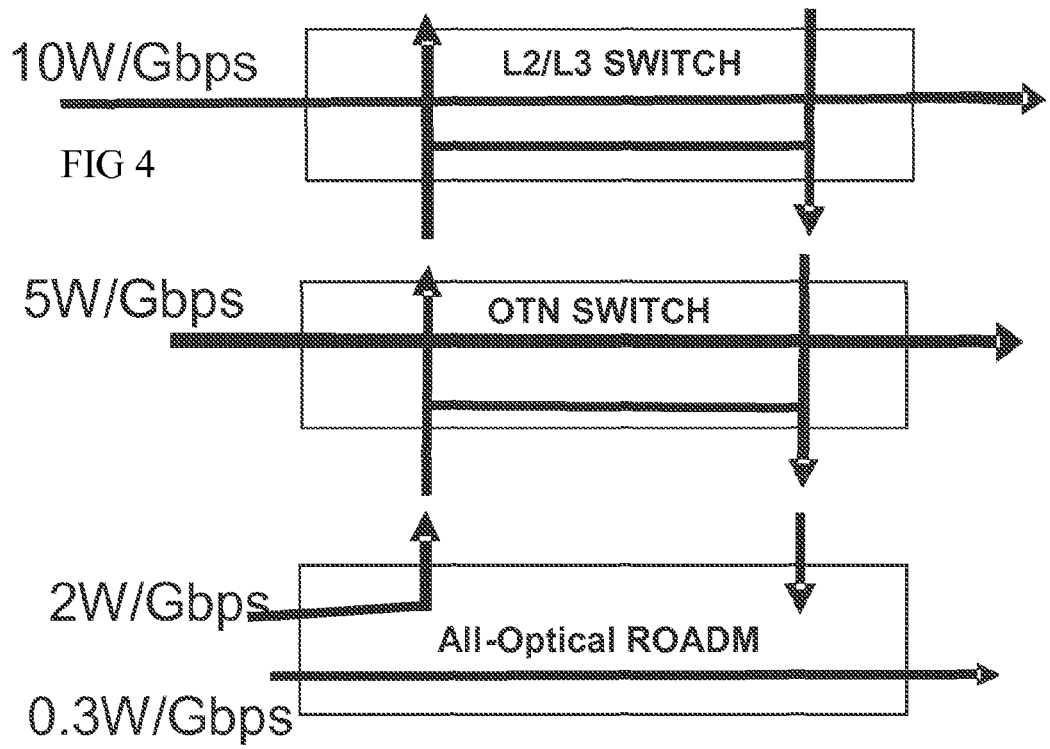

FIGS. 3, 4 Power Consumption Weighting During Path-Provisioning

A Path Computation Element (PCE) can define the path taking into account the total cost of the network in order to maximize the traffic that can be served and to reduce the power consumption. For each signal path though a node a power consumption cost is defined. The cost can be represented as a weight for such a path. For example in case of a multi-layer nodes as shown in FIG. 3, costs for various possible paths through the node will be explained. The node has an optical layer "opto" switch, so that traffic can be passed through or switched up to a higher layer, shown by an OTN switch. This can either pass traffic through or can switch it up to a higher layer represented by a level 2 or 3 packet switch (L2/L3). Interfaces between links or layers are numbered 1 to 10. Interfaces 1 and 2 are interfaces to other nodes at the packet level. Interfaces 3 and 4 are between the packet level and the OTN level, one for each direction. Interfaces 5 and 6 are interfaces to other nodes at the OTN level. Interfaces 7 and 8 are interfaces between the OTN and OPTO levels in both directions, and interfaces 9 and 10 are to other nodes at the OPTO level.

Power consumption as a cost can be represented as a weight to be used during route computation. Several formulas can be considered starting from the bandwidth cost for a port. An example is explained as follows, other examples can be envisaged. Path 1 to 2 has a cost 10 W/Gb/s, while path 5 to 6 has a cost 5 W/Gb/s an the path 9 to 10 has a cost of 0.3 W/Gb/s The add/drop path (7 and 8) has a cost of 2 W/Gbs. These values for power costs attributable to the different paths through the multilayer node are shown in FIG. 4, which shows the same type of node as that of FIG. 3. The power values indicated here refer to the power consumption per Gbps obtained by dividing the total power consumption of the different switching equipments, working at the maximum capacity, divided by the total capacity in terms of Gbps.

This method allows defining a homogeneous cost for any type of technology and node. The weight for power consumption is the product of the ratio between the maximum cost and the cost of the specific path multiplied for the bandwidth of the request. In the example the weight for path 1 to 2 is 33 (10/0.3)*requested bandwidth, the weight for path 5 to 6 is 16 (5/0.3) and the cost of path 9 to 10 is 1 (0.3/0.3). If the signal change layer in a specific node the relative power cost has to be added: it is 2 W/Gb/s from Opto layer to upper layer and 5 W/Gb/s from OTN layer to packet layer.

Several possibilities can be considered as to making use of such weights. For example it could be significant to take into account traffic balancing and power consumption cost. Considering again the example of FIG. 3, a possibility considering a weight for traffic balance, is to associate to each path of the different switching equipments the following weights:

Max BW/Free BW where Max BW is the maximum bandwidth of the link while Free BW is the available bandwidth of such link after some traffic is served. This is a well known method to associate a variable weight to a link that takes into account the bandwidth occupation of the resource. The idea is to add the power consumption weight to such weight. One example is explained as follows:

Weight for path 1 to 2 is Max BW/Free BW+33; weight for 5 to 6 is BW/Free BW+16 while weight for 9 to 10 is BW/Free BW+1. In this specific case the routing favours the node with more free bandwidth and with lowest power consumption. In case there are no free resources, the weight associated to such link is "infinite" whatever the power consumption cost is. In case paths through different switching equipments have the same maximum bandwidth, paths with higher power consumption cost more than paths with lower power consumption.

Other possibilities to translate the power consumption into weights and to associate them to traditional Traffic engineering weights can be considered.

FIG. 5, Node View

Figure 5:
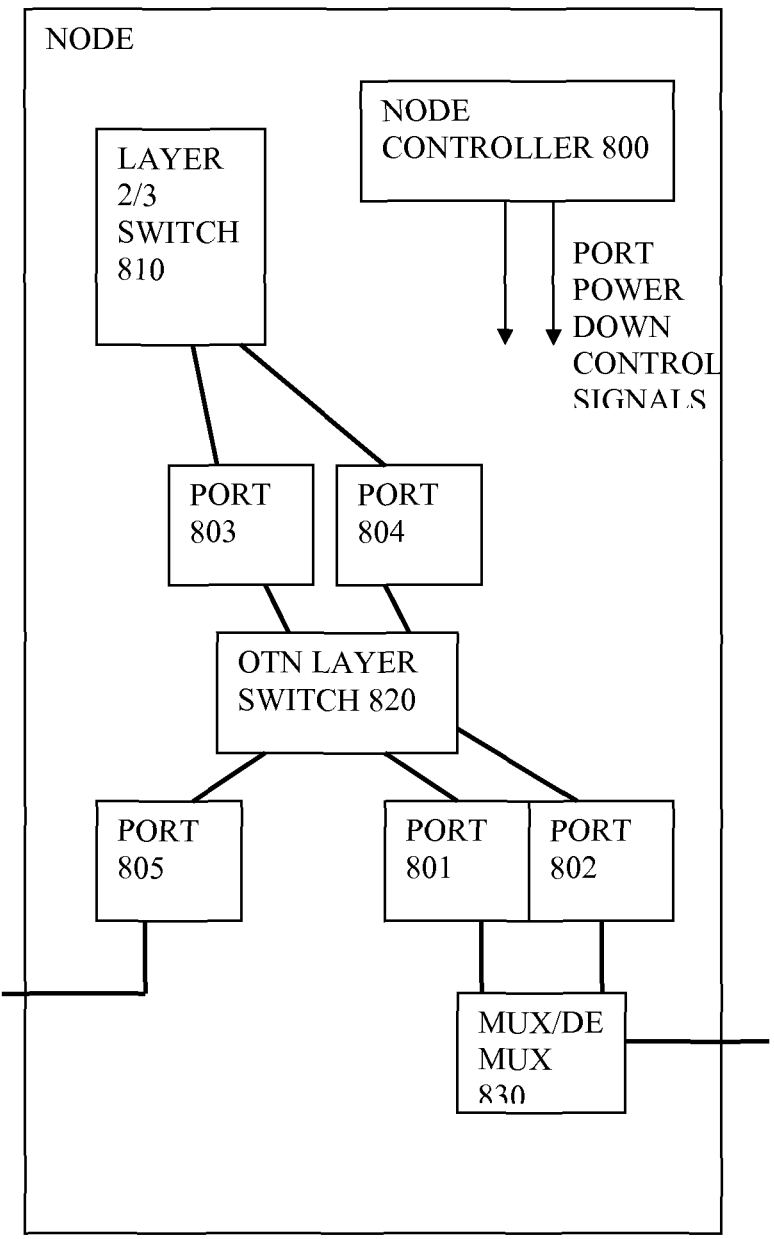
FIG. 5 shows steps according to another embodiment showing determining power consumptions of different choices or aggregation and different choices of layers of switching.

FIG. 5 shows a view of a node similar to that of FIG. 3 or 4, but without the OPTO layer. The figure shows interfaces such as ports between switches at different layers. Other examples can be envisaged. The node has a layer2/3 switch 810, ports 803 and 804 coupling the layer2/3 switch to an OTN layer switch 820. Port 805 couples the node to other nodes. Ports 801 and 802 couple the OTN layer switch to other nodes via a MUX/DEMUX part 830. A node controller 800 can control power to individual ports to power down ports not being used. This part can advertise to other nodes which ports are powered down, and can receive power up instructions from an external part setting up a path using ports which are powered down. An example will be described in more detail below.

Power Consumption Reduction During Dynamic Routing

In case of dynamic routing the power aware routing technique is advantageous if it is possible to perform a smart power handling at the different levels of the Hardware: for example at device, card and chassis level. In fact the power consumption is effectively reduced if the unused interfaces of packet processing devices, switch fabric ports, line cards and also inter chassis can be put in idle state with the functionality reduced to a minimum.

In this case there is a need to make it possible to dynamically turn off and turn on parts of the apparatus. In this case the following steps can be used:
 a) Definition of a cost for each port, node and chassis due to power consumption that is homogeneous for any technology (e.g. the same used for path provisioning case).
 b) Monitoring of the occupied bandwidth on each port, node and chassis (this can be performed by current implementations of GMPLS routing protocols)
 c) Dynamic advertisement of switching-off of some "HW components" of the nodes (this is can performed either by control plane such as OSPF extension, or by network management).
 d) Dynamic turning on of ports needed for a new path (this can be performed either by signaling, such as RSVP or by network management).
 e) dynamic switching off of ports, node and chassis due to the choice to move traffic towards other ports/nodes.

Computation of the path can take into account factors such as:
 a) the cost to use a port, node and chassis
 b) the ports, nodes and chassis that are tuned off
 c) the ports, node and chassis that can be turned-on if needed
 d) the available bandwidth of each port, nodes and chassis
 e) other costs to use the network (such as administrative costs, costs used to optimize the resource usage, service costs defined of operator policy)

Figure 6:
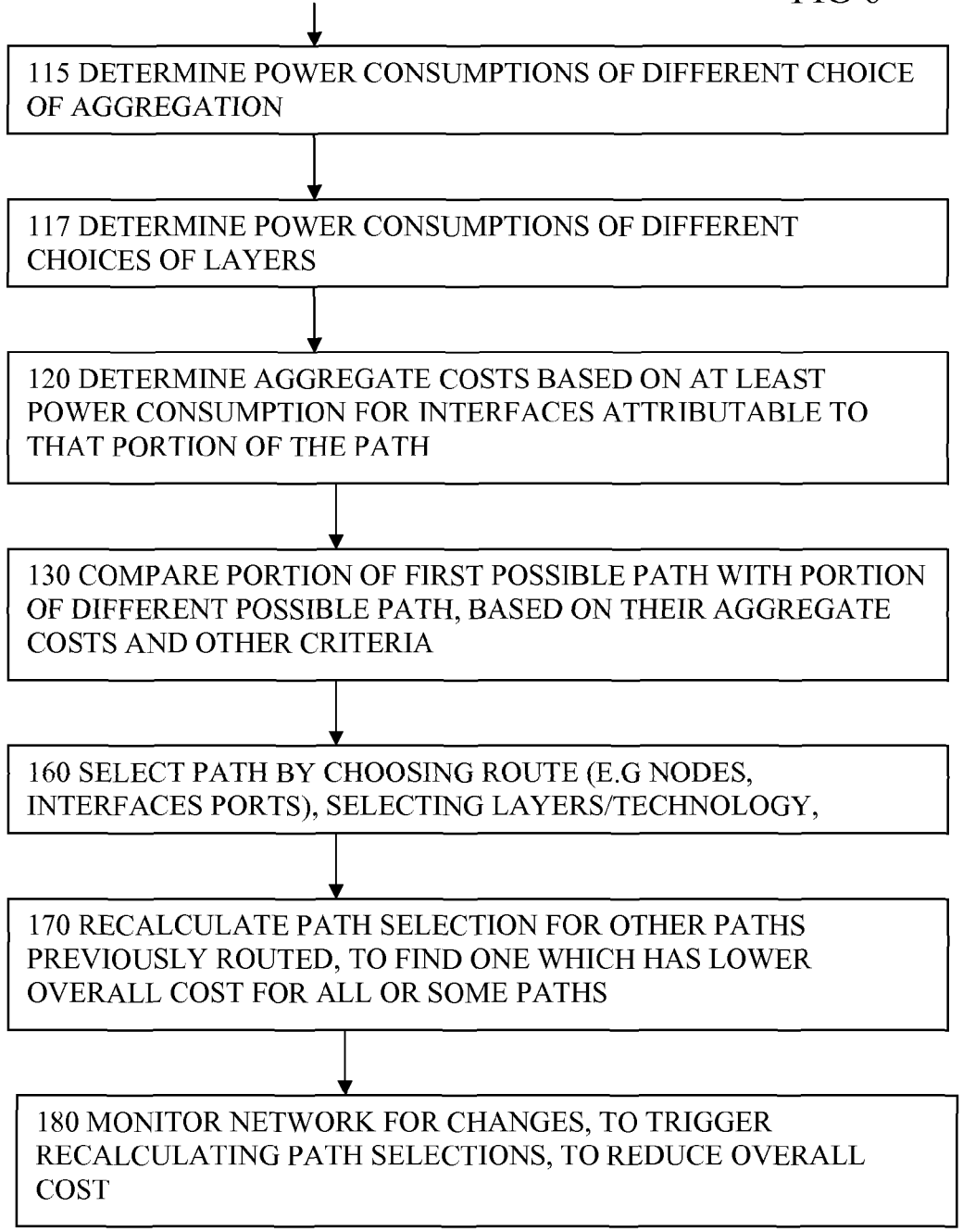
FIG. 6 shows steps according to an embodiment using indications of which parts are switched off, and requesting switch on of needed parts

FIG. 6, Another Embodiment

FIG. 6 shows steps according to another embodiment similar to that of FIG. 2. In this case, at step 115 power consumptions for different choices of aggregations of the requested traffic with other traffic are determined. Similarly, at step 117, power consumptions of different choices of layers at which switching is carried out, is determined. At step 120, an aggregate power consumption for the interfaces attributable to that portion of the path is determined. At step 130 the aggregate is compared to aggregates for alternative possible routes for that portion of the path, and based on other criteria. At step 160, the portion of the path is selected by choosing a route, for example nodes, interfaces and ports, according to the comparison, and involving a chosen aggregation with other traffic, and a chosen layer or layers for switching, and a chosen technology for the switching, if appropriate. These steps can be repeated for other portions of the path until all the path is computed to its destination. At step 170, optionally a group of other paths previously routed are recalculated, to see if changes to the network since the previous routing, now allows a combination of routes with a lower cost. This recalculation can involve the most recent path request, or can be limited to an older group of paths. At step 180, the network can be monitored for changes, to trigger recalculating path selections as set out in step 170.

Figure 7:
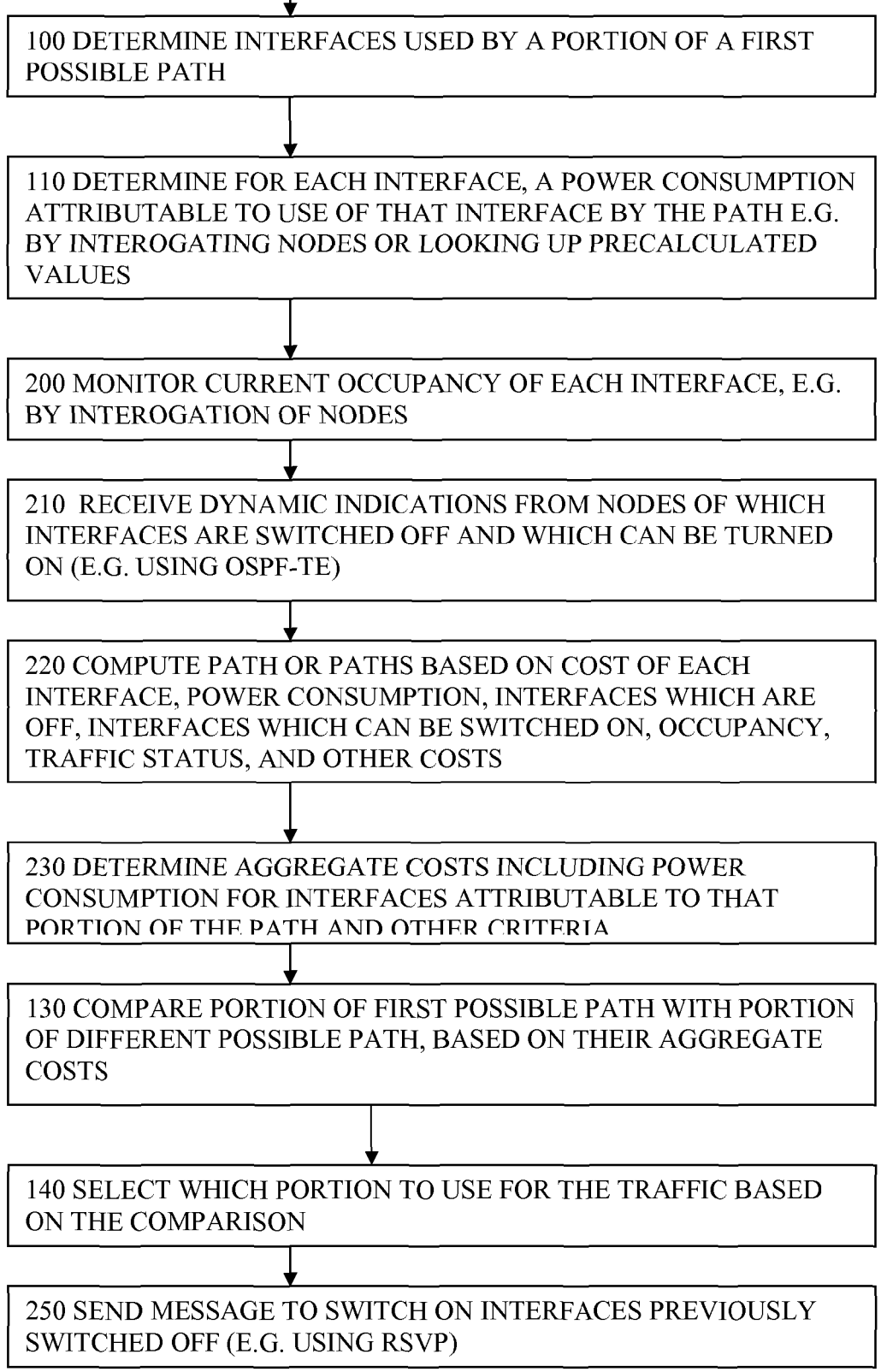
FIG. 7 shows a sequence chart of an embodiment showing setting up a path by requesting switch on of parts.

FIG. 7, Another Embodiment

FIG. 7 shows steps according to another embodiment similar to that of FIG. 2. In this case, at step 100 the interfaces used by a portion of a first possible path are determined. At step 110 for each interface a power consumption is determined, attributable to the use of that interface by the path. At step 200, a current occupancy of each interface is monitored, for example by interrogation of nodes, or by receiving advert messages sent out periodically by nodes, without prompting. At step 210 the path computation part receives dynamic indications from nodes, of which of their interfaces are powered down, and which can be turned on if needed. This can in some networks be implemented using a protocol such as OSPF-TE, with appropriate extension, discussed in more detail below. At step 220, possible paths are computed based on the cost of each interface (group of interfaces, cards or chassis), power consumption, interfaces switched off, interfaces which can be switched on, occupancy, traffic status, and other costs.

At step 230, an aggregate power consumption for the interfaces attributable to that portion of the path is determined. At step 130 the aggregate is compared to aggregates for alternative possible routes for that portion of the path, and based on other criteria. At step 140, which of the possible paths or portions to use is selected based on the comparison, and at step 250, messages are sent to nodes to switch on interfaces previously switched off. This can in some networks be implemented using RSVP, with appropriate extension, as discussed in more detail below.

To explain how some embodiments using RSVP can provide an improved path set up process, first, conventional parts of the RSVP process will be described. A first step is the source entity requesting a new label switched path (LSP) from a first node to another node. This first node can be any node which has add or transmit capability, and this now becomes referred to the ingress node for this path. The second node can be any node which has a drop or receive capability, and this now becomes referred to as the egress node for this path. The request can be authorized by a network management system, or by a human operator for example, and a path computation part can determine a route to the destination or egress node from the ingress node. Then a command goes to the ingress node to reserve the path.

To reserve a path, an RSVP-TE (Traffic Engineering) PATH message, in the form of a Generalized Label Request, is sent out from the first node (which acts as an ingress node) via intermediate nodes along the proposed path, to the last node (acting as an egress node). The egress node returns an RSVP-TE RESV message to the ingress node, back along the path to cause the nodes along the path to confirm the reservation of resources such as bandwidth on switch paths and ports, for the requested path, for traffic of a signal type specified in the message.

Figure 8:
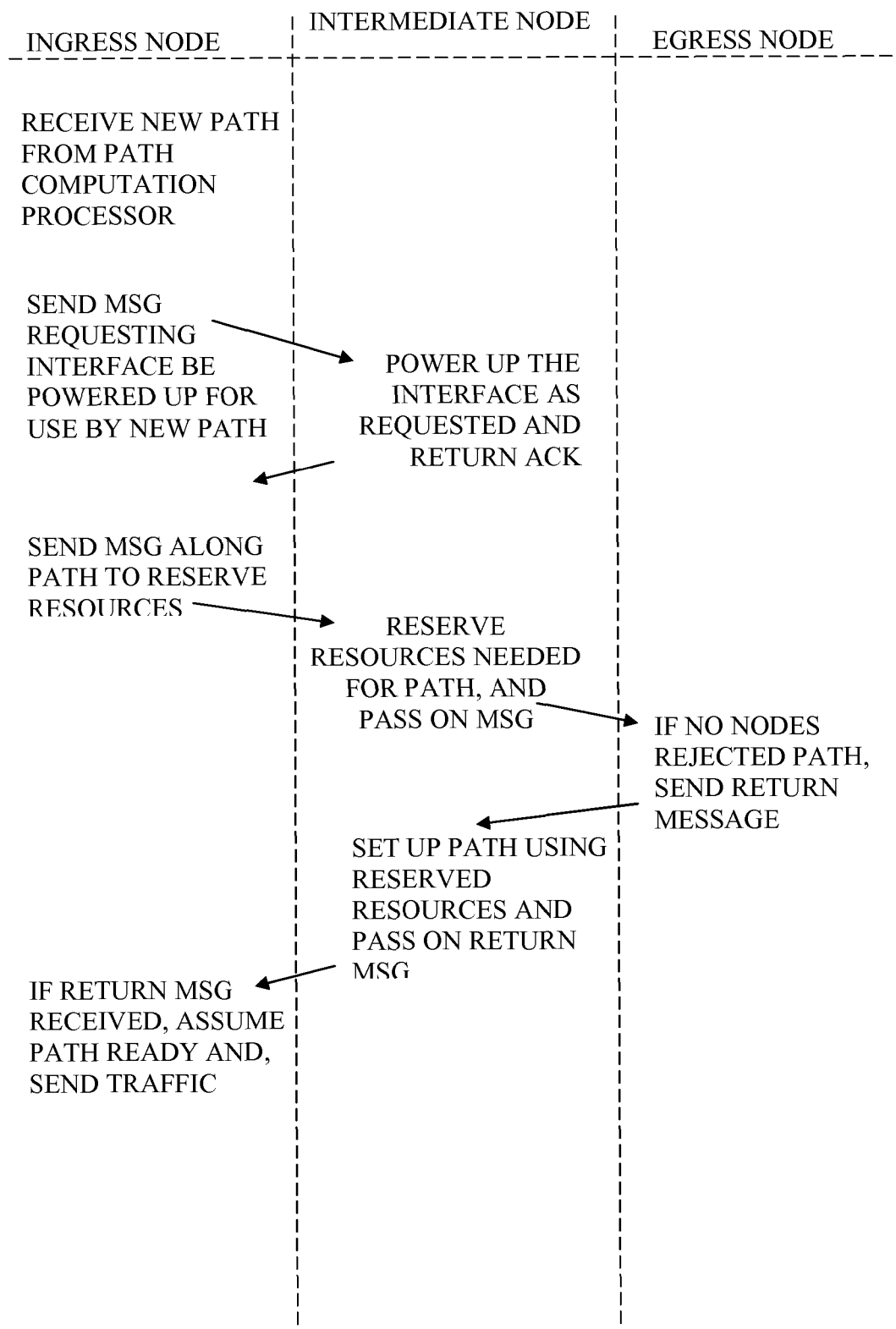
FIG. 8 shows a schematic view of a rack with smart control of switch on of parts.

FIG. 8, Sequence Chart

FIG. 8 shows a sequence chart of an embodiment showing exchanges of messages to set up a path involving requesting switch on of parts. Three columns are shown, a left hand column showing actions at an ingress node, a central column showing actions at an intermediate node along the path, and a right hand column shows actions at an egress node.

The ingress node receives a new path from a path computation processor, and sends a message to nodes along the path requesting an interface be powered up for use by the new path. This can be a separate message, separate from an RSVP "PATH" message or can be incorporated in that message. The intermediate node along the path recognizes if the message applies to it, and if not, it passes the message along the path. If it does apply to the node, then that node powers up the interface as requested, and sends an acknowledgement back to the ingress node. Then the ingress node can follow the conventional path set up sequence which involves sending a message (such as an RSVP "PATH" message) along the path to reserve resources. The intermediate node reserves the resources needed for the path and passes the message on. When it reaches the egress node, if no nodes rejected the path, then a return message is sent, (such as an RSVP "RESV" message). The intermediate node passes on this message and sets up the path using the reserved resources. If this return message is received at the ingress node, then the ingress node can assume the path is ready and can start sending traffic over the path. Other implementations of requesting power up of parts along a path, using other protocols can be envisaged.

Extension of Existing Protocols

The impact on GMPLS protocol is minimal. Anyway the following extensions could be considered:

OSPF-TE could be extended in order to advertise the switch on/off of interfaces due to power saving. The switch off (or idle) could impact more than one interface at time. For example the switch-off (Idle status) could impact a rack, a sub-rack, a card or a single interface. This means that it can be useful to advertise more interfaces at one time instead of a single. Moreover it is useful to advertise the cause for the unavailability of such interfaces (switch-off/idle for power consumption saving) in order to distinguish the case where an interface is not available for failure.

Figure 9:
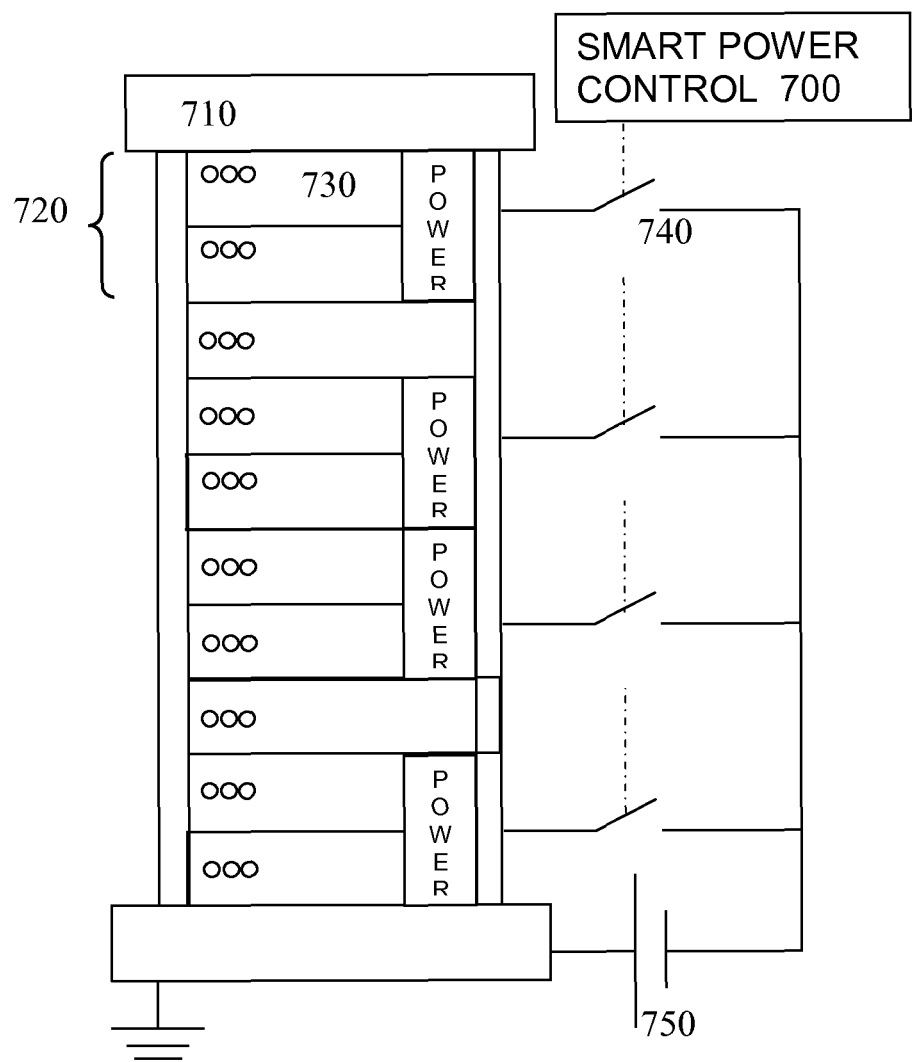
FIG. 9 shows a schematic view of a board with smart control of switch on of parts.

RSVP-TE could be extended to support the switch on of the interfaces that are switched off (idle) for power consumption savings. The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters). These traffic parameters for example could be extended to specify what interfaces to switch on or off. This could be specified at any one or more of a number of different levels of granularity. For example, the hardware at the node could allow for power off or idle mode setting at different levels of the system, for example at rack level (FIG. 8), Subrack level (FIG. 8), Board level (FIG. 9), or Traffic interface level (FIG. 9). Which part to switch on at any of these levels could be specified in the PATH and RESV messages or in other messages in principle, which the node can recognize and act on.

FIG. 9, Power Control at Rack

FIG. 9 shows a schematic view of a rack 710 showing 10 boards 730 in the rack, with smart control of switch on of parts. It shows an example of how to implement a power OFF/Idle mode at rack and subrack level, other examples can be envisaged. A smart power control part 700 can be implemented as a program run by a processor at the node, and can receive a message from a neighbouring node, or directly from a path computation part of a control plane, requesting power up of a given part. As shown in FIG. 8, the smart power control part controls switches 740 to switch the power supply 750 on or off to a subrack level, in this case shown as a pair 720 of circuit boards 730. Each pair has a "power" section which would typically groom the power for each board, to provide filtering, protection, voltage level control and so on as appropriate for the needs of the particular boards. If all switches are controlled together, then the power supply can be switched on or off at the rack level.

Figure 10:
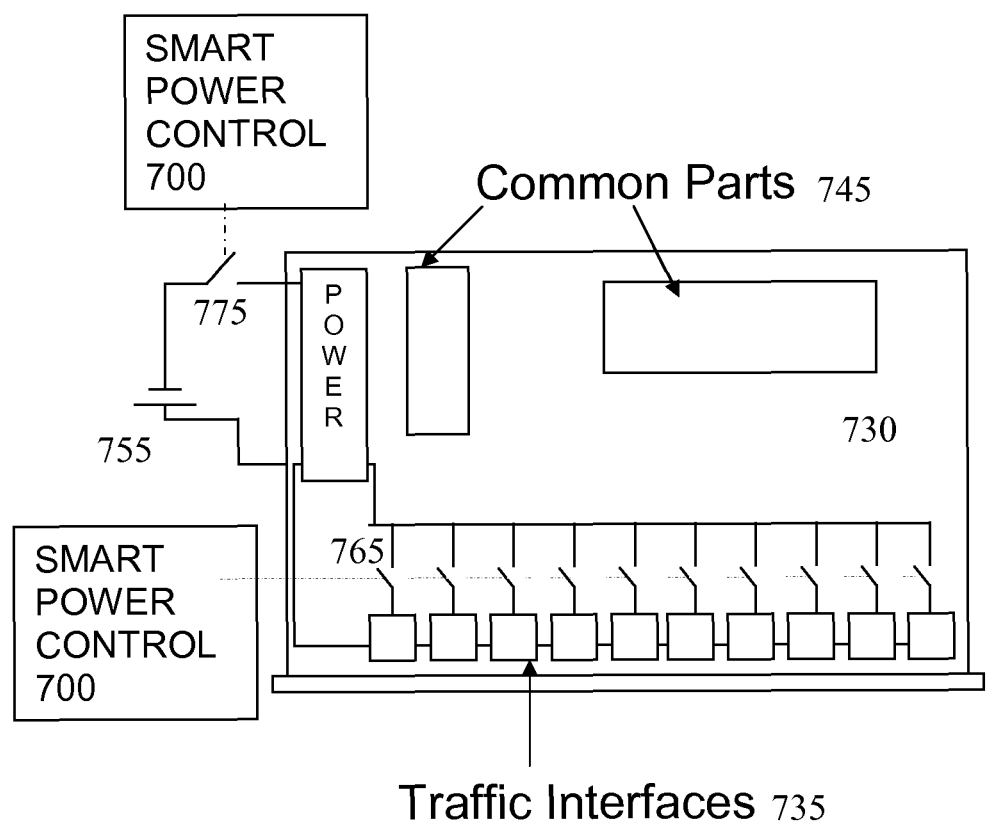
FIG. 10 shows a schematic view of nodes in a network showing parts used to exchange messages to advertise information or set up paths.

FIG. 10, Board Level Power Control

FIG. 10 shows a schematic view of a board with smart control of switch on of parts, showing a Power OFF/Idle mode at board-level and at traffic interface level. A board 730 is shown having a number of traffic interfaces 735, each having a power supply line via individual switches 765, from a "power" section. As in FIG. 9, this would typically groom the power for each board, to provide filtering, protection, voltage level control and so on as appropriate for the needs of the particular circuits on the board. A number of common parts 745 are shown, representing other circuit functions common to the interfaces. A smart power control part 700 can be implemented as a program or programs run by a processor at the node, and can receive a message from a neighbouring node, or directly from a path computation part of a control plane, requesting power up of a given part. As shown in FIG. 10, the smart power control part controls switches 765 to switch the power supply 755 on or off to an individual interface level. The smart power control part can also control a board level switch 775 to control power-off at a board level. This could alternatively be implemented by switched on or off all the interface level switches 735, though this would not include the common parts unless further switches were provided.

Figure 11:
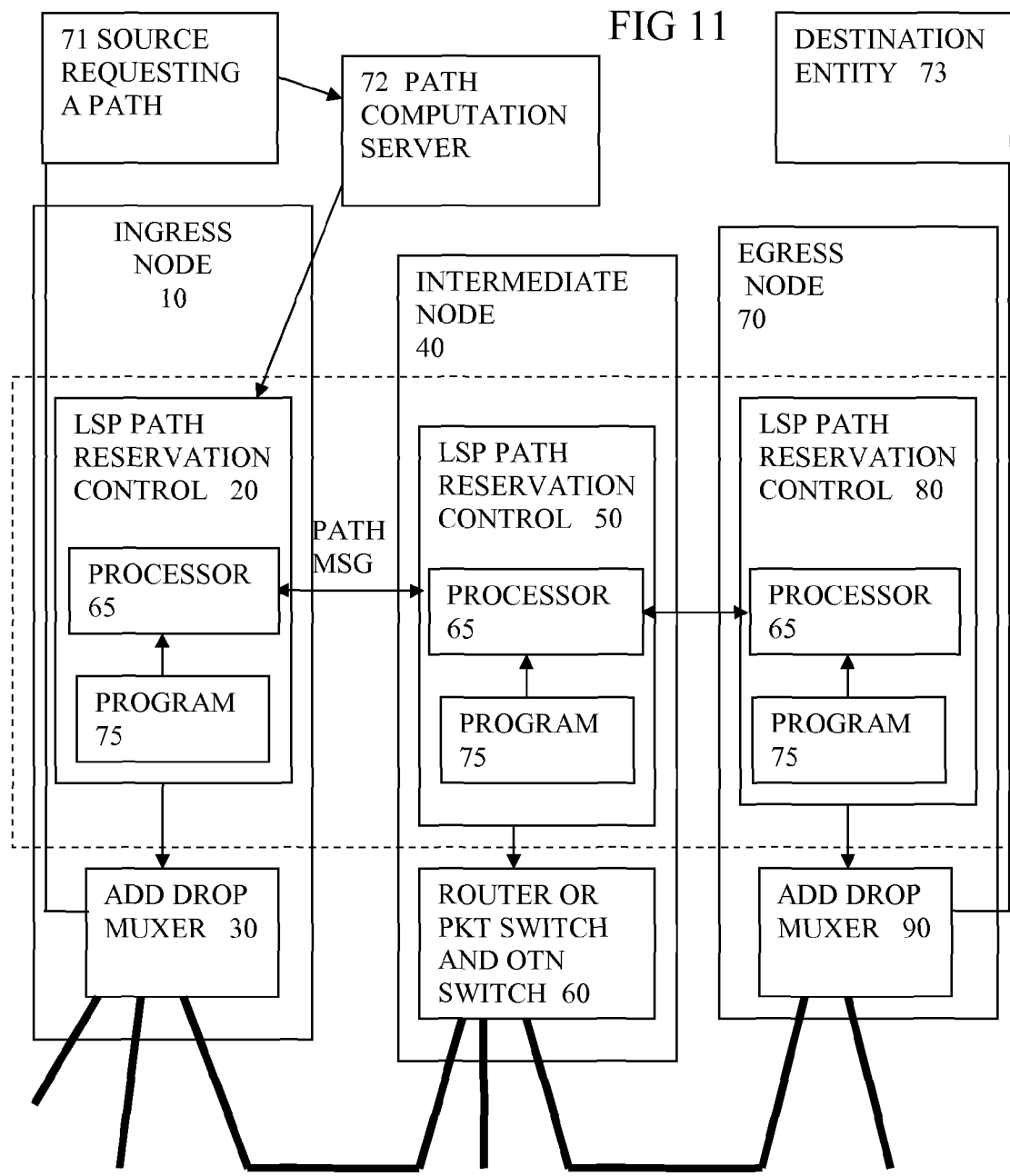
FIG. 11 shows a view of a node showing interfaces such as ports between switches at different layers.

FIG. 11, Network View

FIG. 11 shows a schematic view of nodes in an optical network showing parts used to exchange messages to advertise information or set up paths. Three nodes are shown, there can be many more. An ingress node 10 has an LSR path reservation control part 20, which controls an add drop multiplexer part 30. The reservation control part can have a processor 65 and a store having a program 75 for execution by the processor 65. The program can enable the node to act as an ingress node, or in some cases, to act as an intermediate node for other paths started elsewhere. An intermediate node 40 has its own LSR path reservation control part 50, which controls a router 60. Again, the reservation control part can have a processor 65 and a store having a program 75 for execution by the processor 65. The program can enable the node to act as an intermediate node. If the intermediate node had add drop capabilities, then the program could be chosen to make the node act as an ingress or egress node for other paths. An egress node 70 has its own LSP path reservation control part 80, which controls it's add/drop multiplexer 90. Again, the reservation control part can have a processor 65 and a store having a program 75 for execution by the processor 65. The program can enable the node to act as an egress node for the path shown, or as an ingress or intermediate node for other paths. A source entity 71 requesting a path is shown, as a source of the traffic for which the new path is needed, through the network to a destination entity 73. A path computation part in the form of a server 72 is shown, coupled to receive a traffic request from source part 71. The path computation part then feeds the selected path to the ingress node 10 for setting up the path as described earlier.

If the path computation part is not in the ingress node, but is a remotely located part, optionally centralized to be used by many different nodes, then a communications protocol between the source of the traffic request and the path computation part is needed. This protocol can indicate what information in what format is needed by the path computation part, and what information and what format is to be used for the output of the path list to the ingress node. RFC 4657 is a known example of such a protocol, for use with path computation parts corresponding to the known standard RFC 4655.

The processors of each node can pass messages to each other to advertise information to be used by the path computation server, as described above with reference to FIG. 7, or to control power up of parts of the nodes, as described above with reference to FIGS. 7 to 10.

Optical links are shown for carrying the traffic between the nodes, and a connection is shown between the control parts of the nodes for passing messages to reserve the path. This connection can in principle use either the same or different physical links to those used by the traffic between nodes. The optical links for the traffic can have a multiplex structure of trib slots. A path can use one or more of these trib slots, and a reservation procedure needs to indicate which of these trib slots is reserved.

FIG. 12, Another Embodiment

FIG. 12 shows steps in computing paths using a model of the network. This is one way to implement path computation, others can be envisaged. At step 900 a model of the network is provided or built up, having a separate virtual link for each choice of traffic aggregation, each port or sub-port and so on. At step 910, current information on available capacity and costs are assigned to each link. This can involve finding information from the nodes, or predetermined or predicted information can be assigned. The costs can include power consumption attributable to that choice and for example the values can be homogenised for different technologies and have appropriate attribution of shared power consumption. There can be weighting of links according to congestion level and other criteria.

At step 920, a traffic request is received, and if the request has a specified bandwidth and quality of service, then it may be appropriate to allow only links which have at least that bandwidth and quality of service available. The quality of service might be expressed in terms of reliability, availability of recovery by protection or restoration, delay parameters such as maximum delay or delay variation, and so on. At step 930, a graph search algorithm such as Dijkstra or other known algorithm can be applied to compare the costs of alternative links to find a lowest cost path to nodes successively further away from a starting node, until the destination node is reached. Other algorithms can include peer to peer type routing algorithms for example. The links leading to a given node can be regarded as a portion of a possible path. Hence this is an example of aggregating the costs such as power consumption of interfaces attributable for that portion, and comparing this aggregate cost to aggregate costs of other portions of different possible paths.

At step 940, the selected lowest cost path through the virtual links of the model, is converted into a path list in terms of actual nodes and ports and aggregation information suitable for the actual network. This path can now be set up in the network, for example as shown in step 950, by sending the path information to the ingress node for it to send messages along the path as described above for the RSVP protocol. This can involve sending a first message to the nodes requesting they reserve resources, and then a second message is returned from the egress node requesting the reserved resources be used to set up the path. Of course this can be implemented in other ways using other protocols.

FIG. 13 Sequence Chart

FIG. 13 shows a sequence chart showing passing messages to advertise node information for use in updating a network model for use by a path computation part. A left hand column shows actions of the path computation part. A central column shows actions of a node, and a right hand column shows actions of a further node. The node may periodically send an advert to other nodes and eventually to the path computation part, indicating current occupancy level in terms of bandwidth of its interfaces. At the path computation part, the indication is used to update the virtual links of the network model. If the further node sends a similar advert to the node, this is passed on by the node, eventually reaches the path computation engine and again is used to update the virtual links of the network model.

At the same time, or in separate messages, the node may send an advert of which of its interfaces are currently switched off. This again may reach the path computation part, where the indication is used to update the virtual links of the network model. If the further node sends a similar advert to the node, with information about which interfaces of the further node are switched off, this is also passed on by the node. It eventually reaches the path computation engine and again is used to update the virtual links of the network model.

As has been described, path computation involves determining (120, 930) an aggregate cost for a portion of the path, based at least on the power consumption attributable to use of interfaces along that portion, comparing (130, 930) the portion of the first possible path with a different portion corresponding to a different possible path for the traffic request, based at least on their respective aggregate costs, and selecting (140, 930) which portion to use for the traffic request based on the comparison.

Other variations and embodiments can be envisaged within the claims.

The invention claimed is:

1. A method of determining a path between nodes in a network in response to a traffic request, having the steps of:
   determining for at least a portion of a first possible path, which interfaces are used by that portion, and for each interface, determining a power consumption attributable to use of that interface by the path passing through that node,
   determining an aggregate cost for that portion of the path, based at least on the power consumption attributable to use of interfaces along that portion,
   comparing the portion of the first possible path with a different portion corresponding to a different possible path for the traffic request, based at least on their respective aggregate costs,
   selecting which portion to use for the traffic request based on the comparison, and
   determining whether a further different path can be provided by rerouting some other traffic previously routed, such that a lower total cost for the other traffic and the new traffic can exist.

2. The method of claim 1, the network being live and having existing traffic, the traffic request being made in real time, the method steps being made in real time, and the method having the further step of sending traffic over the selected path.

3. The method of claim 1, the steps being carried out off-line, and the method having the further step of updating a representation of paths occupied by traffic in a logical model of the network based on the selecting step.

4. The method of claim 1, the different possible path involving a different choice of traffic aggregation for the requested traffic with other traffic previously routed, and the attributable power consumption being dependent on the traffic aggregation, and the selecting of the path involving selecting the aggregation.

5. The method of claim 1, the different possible path having a different choice of layers used in a multi layer node, the different layers having different attributable power consumptions, and the selecting involving selecting which of the layers to use.

6. The method of claim 1, and having the step of determining an overall cost of paths for the traffic request and for other traffic requests, and the selecting step being dependent on the overall cost.

7. The method of claim 1, the step of determining a power consumption of an interface involving determining whether part of that interface is currently in a power-down mode, and whether that part would need to be powered up for the path.

8. The method of claim 7, where there is a part currently in a power-down mode, and the method has the further step of setting up the selected path by sending a message to a node which has the power-down part, to cause that part to be powered up.

9. The method of claim 1, other criteria for the comparison comprising a current status of an interface, and the method having the step of sending a query message to nodes on the possible path and receiving a response from the nodes indicating a current status of an interface.

10. The method of claim 1, the network being an optical network having a control plane, the steps being carried out by the control plane, the control plane being arranged to use any type of multi protocol label switching (MPLS) protocols, and the possible paths having interfaces in multiple layers under the control of the control plane.

11. A program stored on a non-transitory computer readable medium and having instructions which when executed by a processor cause the processor to carry out the method of claim 1.

12. A path selection apparatus for a network, for determining a path between nodes in a network in response to a traffic request, each of the nodes in the network comprising a network traffic interface, the apparatus comprising:
   a processor, the processor configured to:
      determine for at least a portion of a possible path, which network traffic interfaces are used by that portion;
      for each network traffic interface, determine a power consumption attributable to use of that network traffic interface by the path passing through that node;
      determine an aggregate cost based on at least power consumption for that portion of the path, attributable to use of network traffic interfaces along that portion;
      compare a portion of a first possible path with a different portion corresponding to a different possible path for the traffic request, based at least on their respective aggregate costs;
      select which portion to use for the traffic request based on the comparison; and
      determine whether a further different path can be provided by rerouting some other traffic previously routed, such that a lower total cost for the other traffic and the new traffic can exist.

* * * * *